(12) United States Patent
Barnes et al.

(10) Patent No.: US 12,097,658 B2
(45) Date of Patent: Sep. 24, 2024

(54) INDEPENDENTLY MOVABLE CARRIAGES CARRYING RESPECTIVE ENERGY SOURCES

(71) Applicant: Hewlett-Packard Development Company, L.P., Spring, TX (US)

(72) Inventors: Arthur H. Barnes, Vancouver, WA (US); Wesley R. Schalk, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/614,246

(22) PCT Filed: Oct. 2, 2019

(86) PCT No.: PCT/US2019/054328
§ 371 (c)(1),
(2) Date: Nov. 24, 2021

(87) PCT Pub. No.: WO2021/066824
PCT Pub. Date: Apr. 8, 2021

(65) Prior Publication Data
US 2022/0219395 A1    Jul. 14, 2022

(51) Int. Cl.
*B29C 64/165*    (2017.01)
*B22F 10/14*    (2021.01)
(Continued)

(52) U.S. Cl.
CPC ............ *B29C 64/165* (2017.08); *B22F 10/14* (2021.01); *B22F 12/13* (2021.01); *B22F 12/224* (2021.01);
(Continued)

(58) Field of Classification Search
CPC ... B29C 64/165; B29C 64/209; B29C 64/393; B29C 64/277; B22F 10/14; B22F 10/30;
(Continued)

(56) References Cited

U.S. PATENT DOCUMENTS

| 6,193,347 B1 | 2/2001 | Askeland et al. |
| 6,364,447 B1 | 4/2002 | Boleda et al. |

(Continued)

FOREIGN PATENT DOCUMENTS

| EP | 3003694 | 10/2018 |
| EP | 3003694 B1 | 10/2018 |

(Continued)

OTHER PUBLICATIONS

Icon, Icon launches new large scale Vulcan II 3D printer to build affordable homes, Mar. 12, 2019, 3ders.org, (10 pages).

(Continued)

*Primary Examiner* — Alison L Hindenlang
*Assistant Examiner* — Erica Hartsell Funk
(74) *Attorney, Agent, or Firm* — Shook, Hardy & Bacon L.L.P.

(57) ABSTRACT

According to examples, a system may include a first carriage carrying a laying device that may form a build material layer over a build area and a first energy source that may apply energy onto the build material layer as the first carriage is moved over the build material layer. The system may also include a second carriage carrying an agent delivery device and a second energy source, in which the agent delivery device may selectively deliver an agent onto the layer of build material and the second energy source may apply energy onto the agent and the layer of build material as the second carriage is moved across the build material layer. The system may further include a controller to control movement of the first carriage and the second carriage across the build (Continued)

area, in which the first carriage may be independently movable with respect to the second carriage.

17 Claims, 7 Drawing Sheets

(51) Int. Cl.
| | |
|---|---|
| *B22F 12/00* | (2021.01) |
| *B22F 12/13* | (2021.01) |
| *B22F 12/45* | (2021.01) |
| *B22F 12/47* | (2021.01) |
| *B22F 12/55* | (2021.01) |
| *B29C 64/209* | (2017.01) |
| *B29C 64/277* | (2017.01) |
| *B29C 64/393* | (2017.01) |
| *B33Y 10/00* | (2015.01) |
| *B33Y 30/00* | (2015.01) |
| *B33Y 50/02* | (2015.01) |
| *B22F 10/30* | (2021.01) |
| *B22F 12/53* | (2021.01) |

(52) U.S. Cl.
CPC .............. *B22F 12/45* (2021.01); *B22F 12/47* (2021.01); *B22F 12/55* (2021.01); *B29C 64/209* (2017.08); *B29C 64/277* (2017.08); *B29C 64/393* (2017.08); *B33Y 10/00* (2014.12); *B33Y 30/00* (2014.12); *B33Y 50/02* (2014.12); *B22F 10/30* (2021.01); *B22F 12/53* (2021.01)

(58) Field of Classification Search
CPC .......... B22F 12/45; B22F 12/13; B22F 12/55; B22F 12/47; B22F 12/224; B22F 12/53
See application file for complete search history.

(56) References Cited

U.S. PATENT DOCUMENTS

| | | | |
|---|---|---|---|
| 7,748,837 | B2 | 7/2010 | Kremers |
| 8,459,778 | B2 | 6/2013 | Lahut et al. |
| 2016/0151973 | A1 | 6/2016 | Juan Jover et al. |
| 2017/0136701 | A1 | 5/2017 | Knecht et al. |
| 2017/0368748 | A1 | 12/2017 | De Pena |
| 2018/0036947 | A1 | 2/2018 | Chanclon et al. |

FOREIGN PATENT DOCUMENTS

| | | | | |
|---|---|---|---|---|
| WO | WO-2016083234 A1 | * | 6/2016 | .............. B22F 3/008 |
| WO | 2017/023281 A1 | | 2/2017 | |
| WO | WO-2018075033 A1 | * | 4/2018 | ........... B29C 64/165 |
| WO | 2018/190784 A1 | | 10/2018 | |
| WO | 2019/147218 A1 | | 8/2019 | |

OTHER PUBLICATIONS

Vulcan, No lasers, No special powders. No hazards. Just normal desktop 3D printing with real metal, Aug. 29, 2018, Vulcan, (2 pages).
International Search Report issued in PCT/US2019/054328 dated Apr. 8, 2021 (1 page).

* cited by examiner

```
┌─────────────────────────────────────────────┐
│ CAUSE A FIRST CARRIAGE AND A SECOND CARRIAGE│
│ TO MOVE IN A FIRST DIRECTION DURING WHICH A │
│ LAYING DEVICE ON A FIRST CARRIAGE IS TO FORM A│
│         BUILD MATERIAL LAYER                │
│                   502                       │
└─────────────────────────────────────────────┘
                      │
                      ▼
┌─────────────────────────────────────────────┐
│ DURING THE FIRST PASS, CAUSE AN AGENT DELIVERY│
│ DEVICE ON THE SECOND CARRIAGE TO SELECTIVELY│
│ DEPOSIT AN AGENT, A SECOND ENERGY SOURCE TO │
│ OUTPUT ENERGY ONTO THE BUILD MATERIAL LAYER │
│                   504                       │
└─────────────────────────────────────────────┘
                      │
                      ▼
┌─────────────────────────────────────────────┐
│   CAUSE THE SECOND CARRIAGE AND THE FIRST   │
│ CARRIAGE TO MOVE IN A SECOND DIRECTION DURING│
│   WHICH THE SECOND ENERGY SOURCE AND THE    │
│    FIRST ENERGY SOURCE ARE TO OUTPUT ENERGY │
│         ONTO THE BUILD MATERIAL LAYER       │
│                   506                       │
└─────────────────────────────────────────────┘
```

INDEPENDENTLY MOVABLE CARRIAGES CARRYING RESPECTIVE ENERGY SOURCES

CLAIM FOR PRIORITY

The present application is a national stage filing under 35 U.S.C 371 of PCT application number PCT/US2019/054328, having an international filing date of Oct. 2, 2019, the disclosure of which is hereby incorporated by reference in its entirety.

BACKGROUND

In three-dimensional (3D) printing, an additive printing process may be used to make 3D solid parts from a digital model. Some 3D printing techniques are considered additive processes because they involve the application of successive layers or volumes of a build material, such as a powder or powder-like build material, to an existing surface (or previous layer). 3D printing often includes solidification of the build material, which for some materials may be accomplished through use of heat, a chemical binder, and/or an ultra-violet or a heat curable binder.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are systems, methods, and 3D fabrication systems for controlling the formation of portions of 3D objects using carriages that each carries a respective energy source, Particularly, the systems disclosed herein may include a first carriage that may carry a laying device and a first energy source and a second carriage that may carry an agent delivery device and a second energy source. The first carriage and the second carriage may be independently movable with respect to each other. As such, for instance, controllers of the systems may independently move the first carriage with respect to the second carriage. The controllers may also move the first carriage and the second carriage together during either or both of a first pass and a second pass of the first carriage and the second carriage across a build area.

Through implementation of the features of the present disclosure, energy, e.g., fusing energy and/or warming energy, may be applied during each pass of the first carriage and the second carriage. In this regard, following deposition of an agent onto a build material layer, fusing energy may be applied four times during two passes of the first carriage and the second carriage. A first pass may include movement of the first carriage and the second carriage from a first side to a second side of a build area and a second pass may include movement of the first carriage and the second carriage from the second side to the first side of the build area. In addition, independent movement of the first carriage and the second carriage in one direction may be construed as a single pass. Thus, for instance, a sufficient amount of energy to cause build material in a build material layer to be joined together may be applied through two passes of the first carriage and the second carriage. Thus, for instance, 3D objects may be fabricated in a shorter length of time and with a relatively smaller number of passes, which may result in reduced energy usage and time savings.

Figure 1:
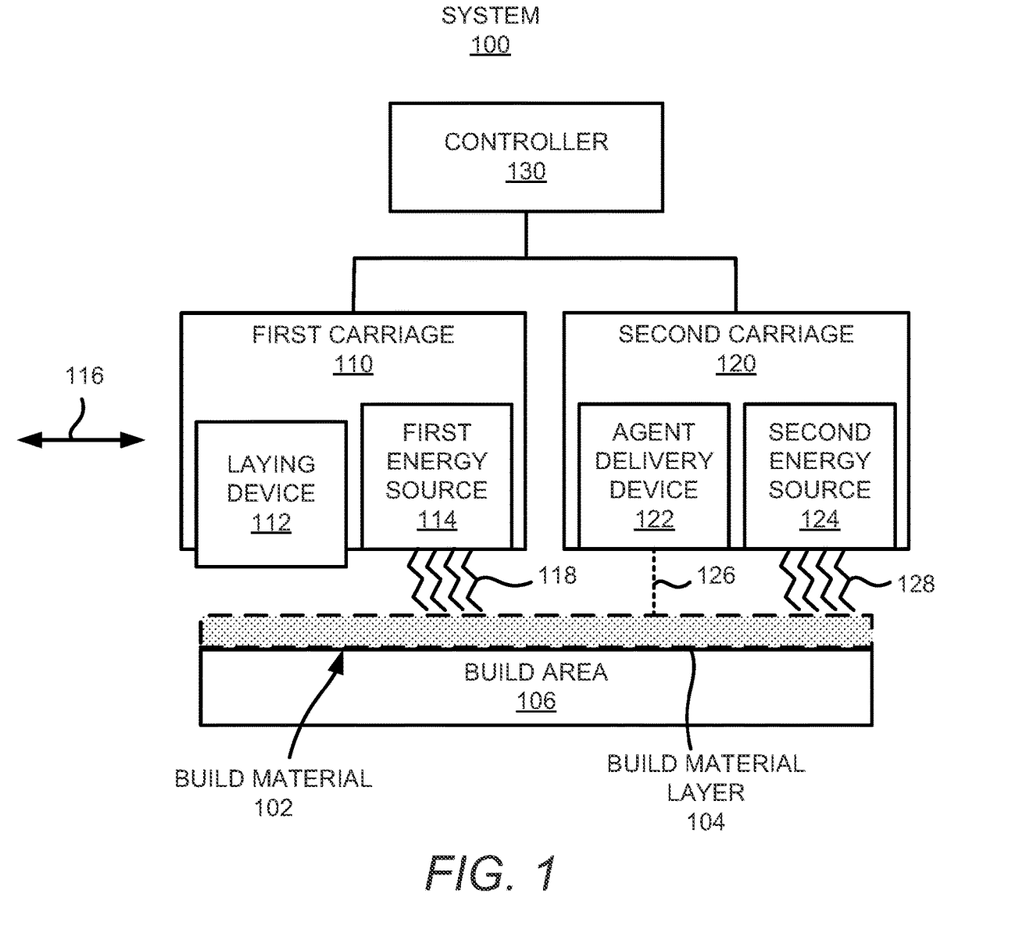
FIG. 1 shows a block diagram of an example system that may include a first carriage and a second carriage that may carry various components for fabricating 3D objects.

Reference is first made to FIG. 1. FIG. 1 shows a block diagram of an example system 100 that may include a first carriage and a second carriage that may carry various components for fabricating three-dimensional (3D) objects, in which the first carriage may be independently movable with respect to the second carriage. It should be understood that the example system 100 depicted in FIG. 1 may include additional features and that some of the features described herein may be removed and/or modified without departing from the scope of the system 100.

The system 100 may be a 3D fabrication system or a portion a 3D fabrication system. The 3D fabrication system may also be termed a 3D printing system, a 3D fabricator, or the like, and may be implemented to fabricate 3D objects through selective binding and/or solidifying of build material 102, which may also be termed build material particles, together. The build material 102 may be formed into a build material layer 104 on a build area 106 during fabrication of a 3D object.

The build material 102 may include any suitable material for use in forming 3D objects. The build material 102 may include, for instance, a polymer, a plastic, a ceramic, a nylon, a metal, combinations thereof, or the like, and may be in the form of a powder or a powder-like material. Additionally, the build material 102 may be formed of particles or powder, which may have dimensions, e.g., widths, diameters, or the like, that are generally between about 5 μm and about 100 μm. In other examples, the build material particles may have dimensions that are generally between about 30 μm and about 60 μm. The particles may have any of multiple shapes, for instance, as a result of larger particles being ground into smaller particles. In some examples, the particles may be formed from, or may include, short fibers that may, for example, have been cut into short lengths from long strands or threads of material. In addition, or in other examples, the particles may be partially transparent or opaque. According to one example, a suitable build material may be PA12 build material commercially known as V1R10A "HP PA12" available from HP Inc.

As shown, the system 100 may include a first carriage 110, in which the first carriage 110 may carry a laying device 112 and a first energy source 114. The laying device 112 may spread, spray, or otherwise form the build material 102 into a build material layer 104. By way of example, the laying device 112 may be a roller, a spreader, or the like, that may spread the build material 102 into the build material layer 104 as the first carriage 110 is moved across the build area 106 as indicated by the arrow 116. As another example, the laying device 112 may be a sprayer, or the like, that may sprinkle the build material 102 to form the build material layer 104 as the first carriage 110 is moved across the build area 106 as indicated by the arrow 116. According to examples, the build area 106 may be provided on a movable platform, which may be moved in a direction away from the first carriage 110 during formation of successive build material layers 104.

The first energy source 114 may output energy 118, e.g., in the form of light and/or heat. As such, for instance, the first energy source 114 may output energy 118 onto the build material layer 104 as first carriage 110 is moved across the build area 106.

The system 100 may also include a second carriage 120, in which the second carriage 120 may carry an agent delivery device 122 and a second energy source 124. The agent delivery device 122 may be a suitable type of agent dispenser that may controllably deposit an agent 126, for instance, in the form of droplets. By way of particular example, the agent delivery device 122 may be a printhead having a plurality of nozzles in which droplet ejectors, e.g., resistors, piezoelectric actuators, and/or the like, may be provided to eject droplets of an agent through the nozzles. In any regard, the agent delivery device 122 may be controlled to selectively deposit the agent 126 onto locations of the build material layer 104 at which build material 102 is to be binded together to form a portion of a 3D object.

According to examples, the agent 126 may be a fusing and/or a binding agent to selectively bind and/or solidify the particles of build material 102. In particular examples, the agent 126 may be a chemical binder, a thermally curable binder, and/or the like. In other particular examples, the agent 126 may be a fusing agent that may increase the absorption of energy to selectively fuse the particles of build material 102.

According to one example, a suitable fusing agent may be an ink-type formulation including carbon black, such as, for example, the fusing agent formulation commercially known as V1Q60A "HP fusing agent" available from HP Inc. In one example, such a fusing agent may additionally include an infra-red light absorber. In one example such fusing agent may additionally include a near infra-red light absorber. In one example, such a fusing agent may additionally include a visible light absorber. In one example, such a fusing agent may additionally include a UV light absorber. Examples of fusing agents including visible light enhancers are dye based colored ink and pigment based colored ink, such as inks commercially known as CE039A and CE042A available from HP Inc.

According to examples, the second carriage 120 may carry an additional agent delivery device that may controllably output another type of agent. The other type of agent may be an agent having a different color than the agent 126 outputted by the agent delivery device 122, a different formulation from the agent 126, and/or the like. By way of example, the other agent delivery device may output a detailing agent, which may, for instance, function as a cooling agent that may be applied onto the build material layer 104 to reduce and control the occurrence of thermal bleed from the build material 102 that is being heated. According to one example, a suitable detailing agent may be a formulation commercially known as V1Q61A "HP detailing agent" available from HP Inc.

In any regard, the second energy source 124 may output energy 128 as the second carriage 120 is moved across the build area 106 in a first direction 116 to cause the particles of build material 102 on which the agent 126 has been deposited to bind together and/or melt and subsequently fuse together. That is, the second energy source 124 may apply energy 128 onto the build material layer 104 and the deposited agent 126 as the second carriage 120 is moved with the agent delivery device 122 in a lead position. In addition, the first energy source 114 may apply energy 118 onto the build material layer 104 and the deposited agent 126 as the first carriage 110 and the second carriage 120 are moved with the second carriage 120 in a lead position. In this regard, energy 118, 128 may be applied onto the build material layer 104 as the first carriage 110 and the second carriage 120 are moved in either of the directions denoted by the arrow 116.

According to examples, the first energy source 114 and the second energy source 124 may each output heating energy that may warm the build material layer 104 and/or may output fusing energy that may cause the build material 102 on which the agent 126 has been deposited to join together. The warming energy may be of sufficient strength to maintain the build material 102 within a predefined range of temperatures, in which an upper limit temperature of the predefined range may be a melting point temperature of the build material 102, an activation temperature of a thermally activated chemical binder, or the like. In addition, a lower limit temperature of the predefined range may be a temperature from which the build material 102 upon which the agent 126 has been deposited to reach a melting point temperature of the build material 102 when fusing energy is applied to the build material 102 and the agent 126, In this regard, the fusing energy may be of sufficient strength to cause the build material 102 on which the agent 126 has been deposited to bind together, e.g., melt and fuse, cause a chemical binder to activate, or the like.

According to examples, the first energy source 114 may include a fusing lamp and a heating lamp and the second energy source 124 may include a fusing lamp. In other examples, the second energy source 124 may also include both a fusing lamp and a heating lamp. As such, for instance, the first energy source 114, and in examples, the second energy source 124, may apply both the warming energy and the fusing energy onto the build material layer 104 and any agent 126 deposited on the build material layer 104 as the first carriage 110 is moved across the build area 106. In addition, the second energy source 124 may apply fusing energy onto the build area 106 and deposited agent 126 as the second carriage 120 is moved across the build area 106.

As the first carriage 110 and the second carriage 120 may be scanned across the build area 106 in both directions indicated by the arrow 116 and the first energy source 114 and the second energy source 124 may remain active during the scans, the build material 102 in the build material layer 104 may receive warming and fusing energy multiple times during each of the scans. In addition, the agent delivery device 122 may be positioned at a location that is between the first energy source 114 and the second energy source 124 such that the agent delivery device 122 may deliver the agent 126 while moving in both directions indicated by the arrow 116. Moreover, the first energy source 114 and the second energy source 124 may apply fusing energy as the agent delivery device 122 delivers the agent 126 in both directions.

According to examples, the fusing lamps in the first energy source and the second energy source may have a different color temperature as compared with the heating lamp in the first energy source. That is, for instance, the fusing lamps may output a different spectral power distribution than the heating lamp. Particularly, the heating lamp may produce energy having wavelengths that the build material 102 more readily absorbs and the fusing lamps may produce energy having wavelengths that the agent 126 more readily absorbs. By way of particular example, the fusing lamps may have a 2700K color temp which may produce energy in the near-IR part of the color spectrum and the warming lamps may have a 1800K color temp lamp that may have energy content in the mid-IR range where the build material 102 may be more absorptive.

The system 100 may further include a controller 130 that may control movement of the first carriage 110 and the second carriage 120. That is, for instance, the controller 130 may control actuators, motors, or the like, that may independently control movement of the first carriage 110 and the second carriage 120 across the build area 106. That is, the controller 130 may cause the first carriage 110 and the second carriage 120 to move concurrently with each other or independently with respect to each other. The controller 130 may also, in some examples, control the timings at which the agent delivery device 122 may deposit the agent 126 onto the build material layer 104 to form portions of a 3D object in the build material layer 104.

The controller 130 may be a semiconductor-based microprocessor, a central processing unit (CPU), an application specific integrated circuit (ASIC), a field-programmable gate array (FPGA), and/or other suitable hardware device. Although not shown, the system 100 may include a memory that may have stored thereon machine-readable instructions (which may also be termed computer readable instructions) that the controller 130 may execute. The memory may be an electronic, magnetic, optical, or other physical storage device that contains or stores executable instructions. The memory may be, for example, Random Access memory (RAM), an Electrically Erasable Programmable Read-Only Memory (EEPROM), a storage device, an optical disc, and the like. The memory, which may also be referred to as a computer readable storage medium, may be a non-transitory machine-readable storage medium, where the term "non-transitory" does not encompass transitory propagating signals.

Figure 2A:
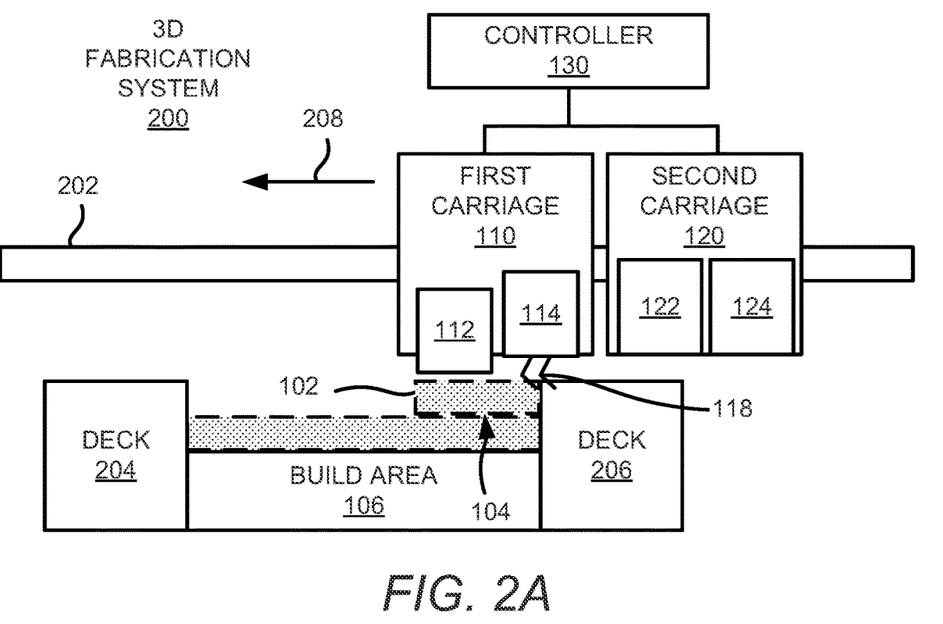
FIGS. 2A-2C, respectively, show an example 3D fabrication system at various stages of operation in the formation of portions of a 3D object.
Figure 2B:
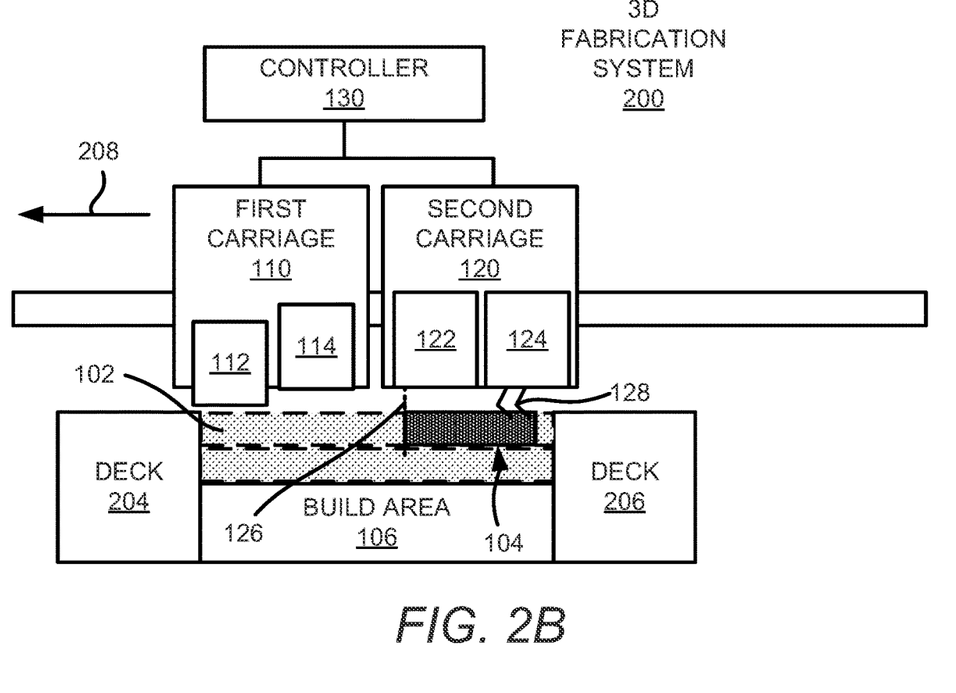
Figure 2C:
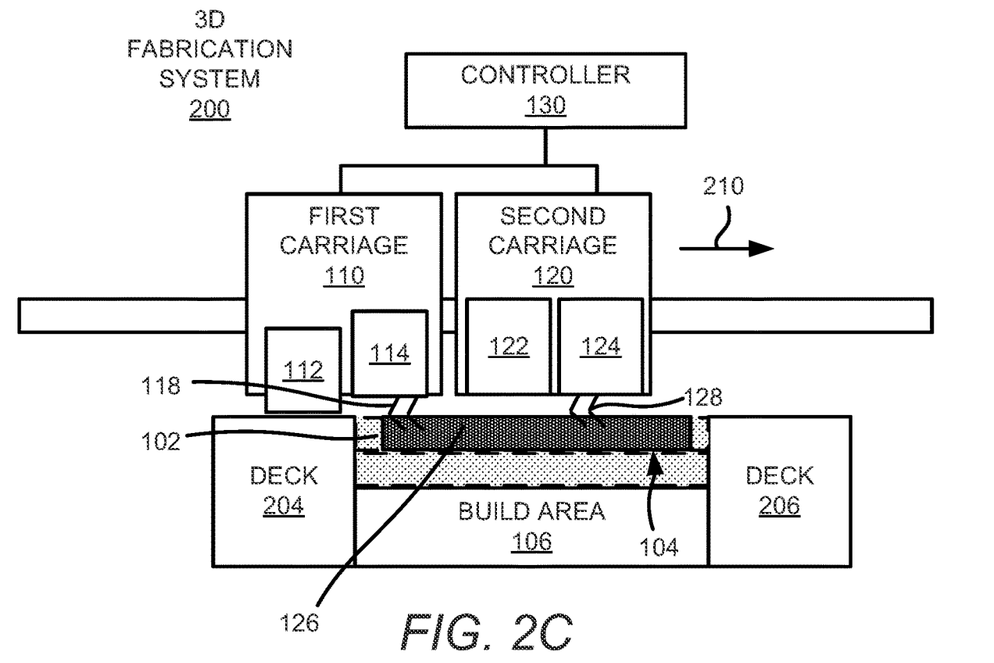

Reference is now made to FIGS. 2A-2C, which respectively show an example 3D fabrication system 200 at various stages of operation in the formation of portions of a 3D object. It should be understood that the example 3D fabrication system 200 depicted in FIGS. 2A-2C may include additional features and that some of the features described herein may be removed and/or modified without departing from the scope of the 3D fabrication system 200.

As shown, the 3D fabrication system 200 may include the components of the system 100 as well as other components. The other components may include a mechanism 202 along which the first carriage 110 and the second carriage 120 may move across the build area 106. The mechanism 202 may be any suitable mechanism by which and/or which may cause the first carriage 110 and/or the second carriage 120 to be moved. For instance, the mechanism 202 may include an actuator, a belt, and/or the like that may cause the first carriage 110 and/or the second carriage 120 to be moved and that the controller 130 may control to move the first carriage 110 and/or the second carriage 120.

The other components may also include decks 204 and 206 from which build material 102 may be supplied for formation into a build material layer 104. For instance, the deck 206 may supply an amount of build material 102 on top of the deck 206 that the laying device 112 may push the build material 102 over the build area 106 as the first carriage 110 is moved in a first direction 208 as shown in FIG. 2A. In other examples, however, the laying device 112 may spray or otherwise deposit the build material 102 onto the build area 106 as the first carriage 110 is moved in the first direction 208. In addition, as the first carriage 110 is moved in the first direction 208, the first energy source 114 may apply energy 118, e.g., warming energy, onto the build material layer 104, for instance, to warm the build materials 102 in the build material layer 104 to an intended temperature.

Turning now to FIG. 2B, the second carriage 120 may also be moved in the first direction 208. The controller 130 may cause the first carriage 110 and the second carriage 120 to be moved together in the first direction 208, for instance, as a first pass across the build area 106. In addition, the controller 130 may control the agent delivery device 122 to selectively deposit an agent 126 onto the build material layer 104 as the second carriage 120 is moved in the first direction 208. That is, the controller 130 may control the agent delivery device 122 to deposit the agent 126, e.g., droplets of the agent 126, onto selected areas of the build material layer 104 that are to be joined together to form part of a 3D object in that build material layer 104.

In addition, the second energy source 124 may apply energy 128, e.g., fusing energy, onto the deposited agent 126 and the build material layer 104 as the second carriage 120 is moved in the first direction 208 to cause the adjacent build material 102 on which the agent 126 has been deposited to become joined together. That is, for instance, the applied energy 128 may cause the build material 102 onto which the agent 126 has been deposited to melt, e.g., reach a melting point temperature, and subsequently fuse together as the build material 102 solidifies. In other examples, the applied energy 128 may cause the deposited agent 126 to become thermally activated and thus bind the build material 102 together.

The first carriage 110 and the second carriage 120 may continue to move in the first direction 208 until, for instance, the second energy source 124 is positioned over and/or beyond the deck 204. In addition, following the second carriage 120 reaching this position, as shown in FIG. 2C, the controller 130 may cause the second carriage 120 to move in a second direction 210. As the second carriage 120 is moved in the second direction 210, the second energy source 124 may output energy, e.g., fusing energy, onto the applied agent 126 to further cause the adjacent build material 102 on which the agent 126 has been applied to join together.

In addition, the controller 130 may cause the first carriage 110 to move in the second direction 210. The controller 130 may cause the second carriage 120 and the first carriage 110 to be moved together, or separately, in the second direction 210, for instance, as a second pass across the build area 106. In addition, the first energy source 114 may apply energy 118, e.g., fusing energy and warming energy, onto the applied agent 126 and the build material layer 104, to further cause the build material 102 onto which the agent 126 has been deposited to become joined together. In this regard, fusing energy may be applied onto the build material 102 four times during two passes of the first carriage 110 and the second carriage 120 across the build area 106.

According to examples, following movement of the first carriage 110 and the second carriage 120 in the second direction 210, the controller 130 may cause the build area 106 to be moved vertically, e.g., in a direction away from the first carriage 110. In addition, the operations outlined with respect to FIGS. 2A-2O and the lowering of the build area 106 may be repeated until portions of a 3D object are fabricated.

Figure 3A:
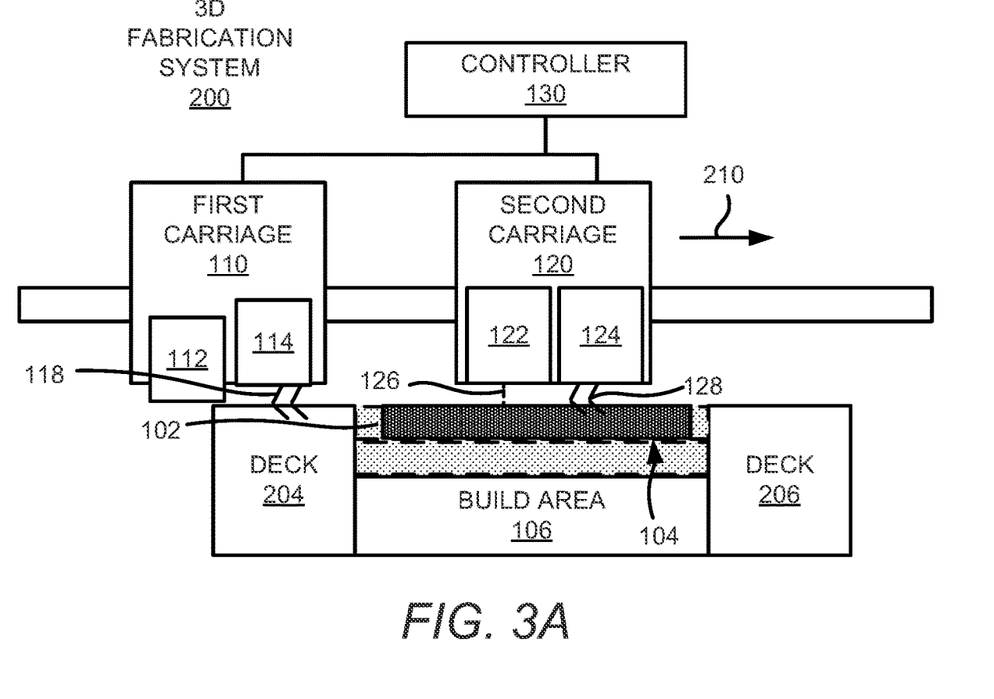
FIGS. 3A-3C, respectively, show alternative operations that the 3D fabrication system may implement during formation of the portion of the 3D object.
Figure 3B:
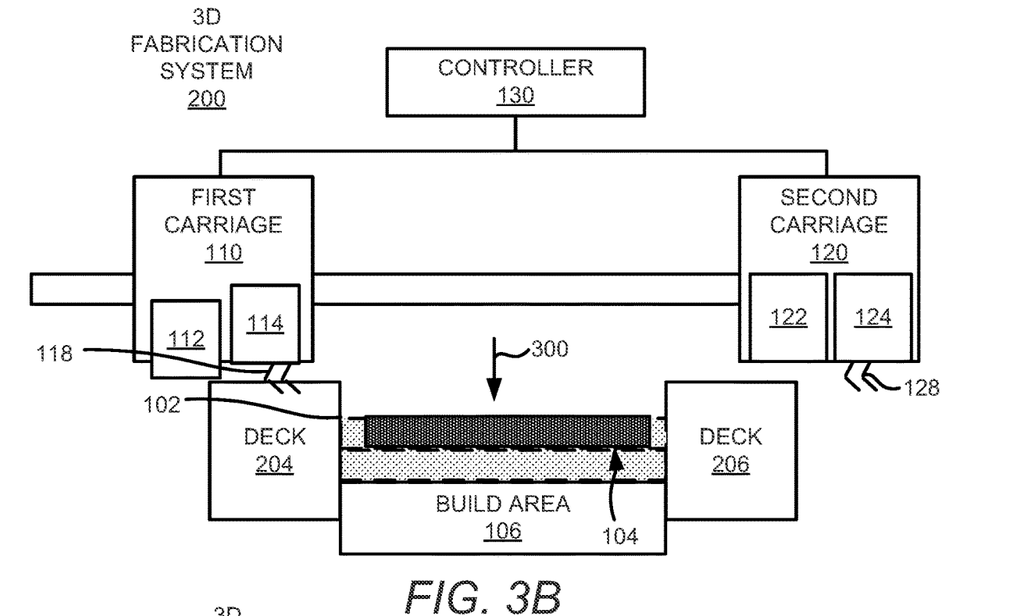

Turning now FIGS. 3A and 3B, there are shown alternative operations that the 3D fabrication system 200 may implement during formation of the portion of the 3D object. That is, as shown in FIG. 3A, the second carriage 120 may be moved in the second direction 210 independently from the first carriage 110. In addition, the agent delivery device 122 may selectively deposit the agent 126 onto the same and/or different areas of the build material layer 104 at which the agent 126 was selectively deposited during the first pass.

As shown in FIG. 3B, the controller 130 may cause the build area 106 to move in a direction away from the first carriage 110, e.g., in the direction 300. The build area 106 may be moved a distance that is equal to a height of the build material layer 104. That is, for instance, the build area 106 may be provided on a movable platform (not shown) and the controller 130 may cause an actuator of the movable platform to move the platform in the direction 300.

As shown in FIG. 3O, the controller 130 may cause the first carriage 110 to move in the second direction 302 independently of the second carriage 120. As the first carriage 110 is moved in the second direction 302, the first energy source 114 may apply energy 118, e.g., fusing energy, onto the applied agent 126 and the build material layer 104. In addition, the deck 204 may have provided build material 102 or the laying device 112 may otherwise cause a next build material layer 304 to be formed. The first carriage 110 may be moved across the build area 106 until, for instance, the first carriage 110 reaches the second carriage 120 such that the next build material layer 304 may be formed. In addition, the first carriage 110 may be moved in the first direction during a next pass as shown in FIG. 2A, and the laying device 112 may apply build material 102 to form the next build material layer 304. In some examples, the laying device 112 may form a portion, e.g. a bottom half, of the next build material layer 304 as the first carriage 110 moves in the second direction 302 and the laying device may form the remaining portion, e.g., a top half, of the next build material layer 304 as the first carriage 110 moves in the first direction 208. In any regard, following the movement of the first carriage 110 from one side to the other side of the build area 106, the operations shown in FIGS. 2A, 2B, and 3A-3O may be repeated until portions of the 3D object are formed.

According to examples, following movement of the first carriage 110 and the second carriage 120 from one side of the build area 106 to the other side of the build area 106 as shown in FIGS. 2A and 2B, the controller 130 may cause the second carriage 120 to be moved following expiration of a predefined time period. The predefined time period may be based on, for instance, the rate at which the build material 102 may cool, which may itself be based on a number of factors including, for instance, the ambient temperature of a build chamber in which the build material 102 is provided, the volume of agent 126 applied to the build material layer 104, the increase in temperature caused through application of energy 118, 128 onto the build material layer 104, etc. Thus, for instance, the predefined time period may be relatively shorter in instances in which the build material 102 may be cooled at a relatively faster rate and may be relatively longer in instances in which the build material 102 may be cooled at a relatively slower rate.

Figure 3C:
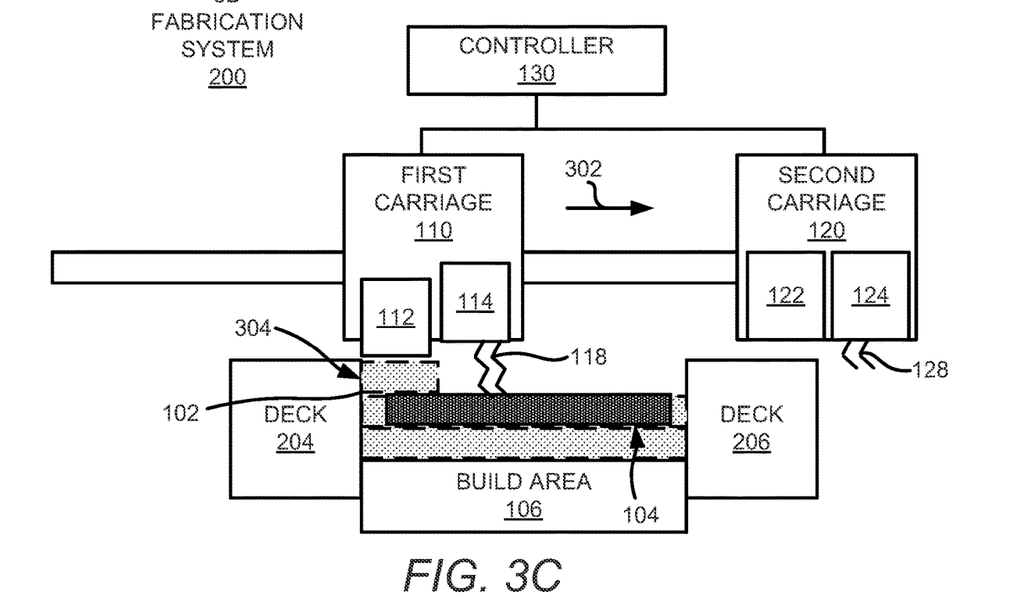

Similarly, the controller 130 may control the timing at which the first carriage 110 begins to move in the second direction 302 following movement of the second carriage 120 based on the rate at which the build material 102 may cool. In other words, the timing may be based on a timing that may maintain the build material 102 at or above a predetermined temperature during the fabrication process on the build material layer 104. Thus, for instance, the controller 130 may cause the first carriage 110 to begin to move in the second direction 302 prior to the second carriage 120 reaching the other side of the build area 106 or may cause the first carriage 110 to begin to move in the second direction 302 following the second carriage 120 reaching the other side of the build area 106.

Figure 4:
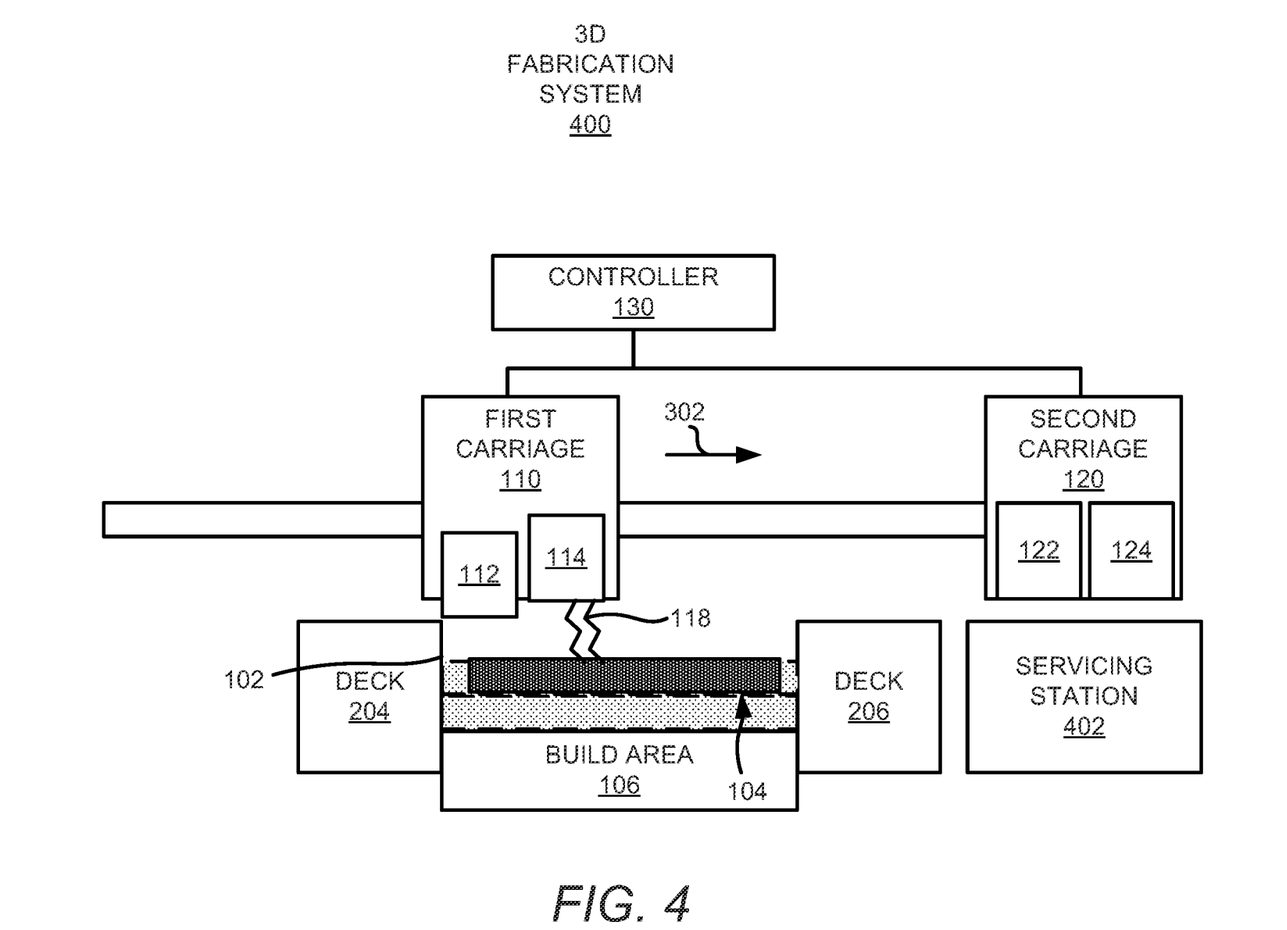
FIG. 4 shows a block diagram of an example 3D fabrication system having a servicing station.

Turning now to FIG. 4, there is shown a block diagram of an example 3D fabrication system 400 having a servicing station 402. As shown in FIG. 4, the second carriage 120 may be positioned over a servicing station 402. The servicing station 402 may include components for servicing the agent delivery device 122. Servicing may include cleaning or other operations to improve the operations of the agent delivery device 122. In some examples, the controller 130 may cause the second carriage 120 to be positioned with respect to the servicing station 402 such that the agent delivery device 122 may be serviced at set times, after a set number of printing operations, as needed, etc. In any regard, while the second carriage 120 is being serviced, the controller 130 may cause the first carriage 110 to move across the build area 106 such that the first energy source 114 may continuously apply energy 118 onto the build material layer 104 to, for instance, maintain the build material 102 in the build material layer 104 at or above a predetermined temperature.

Figure 5:
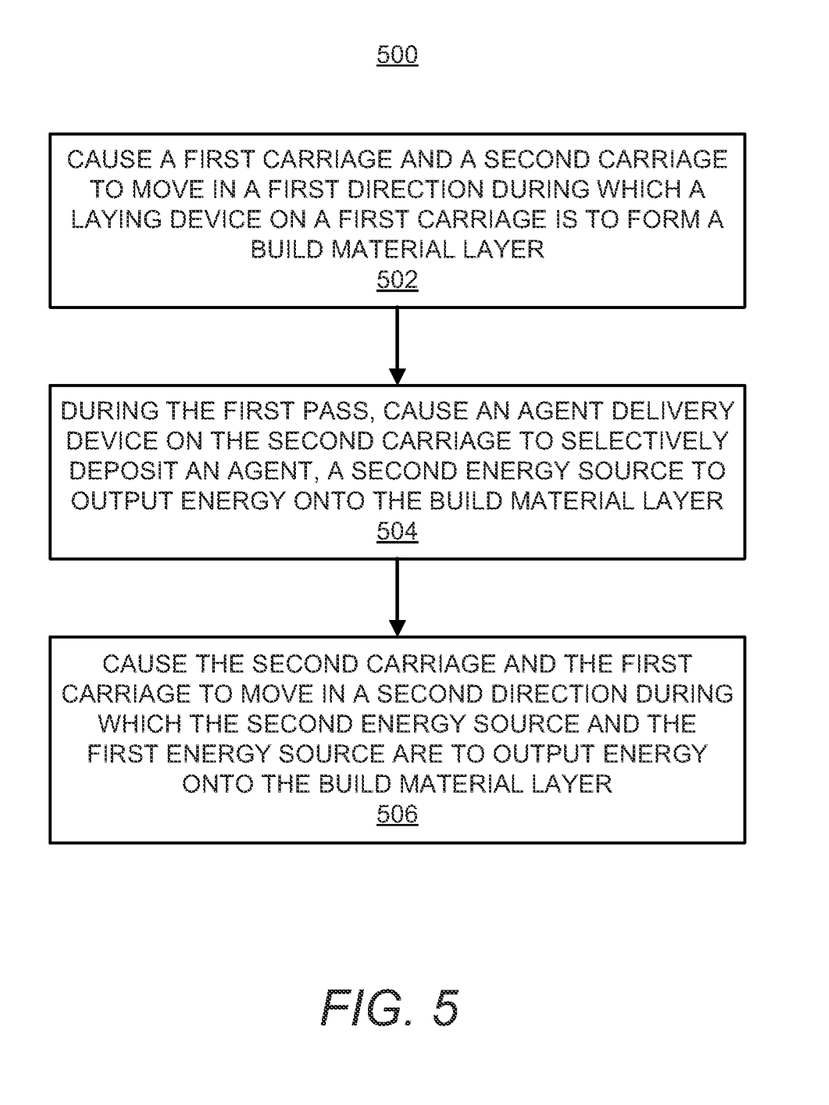
FIG. 5 shows a flow diagram of an example method for controlling movement of a first carriage and a second carriage, the first carriage and the second carriage each including a respective energy source.

Turning now to FIG. 5, there is shown a flow diagram of an example method 500 for controlling movement of a first carriage and a second carriage, the first carriage 110 and the second carriage 120 each including a respective energy source 114, 124. It should be understood that the method 500 depicted in FIG. 5 may include additional operations and that some of the operations described therein may be removed and/or modified without departing from the scope of the method 500. The description of the method 500 is also made with reference to the features depicted in FIGS. 1-4 for purposes of illustration. Particularly, the controller 130 may execute some or all of the operations included in the method 500.

At block 502, the controller 130 may cause a first carriage 110 and a second carriage 120 to move in a first direction 208 across a build area 106 during a first pass. During the first pass, a laying device 112 on the first carriage 110 may form a build material layer 104 and a first energy source 114 on the first carriage 110 to output energy 118.

At block 504, the controller 130 may cause an agent delivery device 122 on the second carriage 120 to selectively deposit an agent 126 onto the build material layer 104. Moreover, a second energy source 124 on the second carriage 120 may output energy 128 to heat the build material layer 104 and the deposited agent 126, At block 506, the controller 130 cause the first carriage 110 and the second carriage 120 to move in a second direction 210, 302 across the build area 106 during a second pass. During the second pass, the second energy source 124 and the first energy source 114 may output energy to heat the build material layer 104 and the deposited agent 126. In some examples, the first carriage 110 and the second carriage 120 may move together during the first pass and the second pass. However, in other examples, the first carriage 110 and the second carriage 120 may be moved separately with respect to each other during either or both of the first pass and the second pass. For instance, during the second pass, the first carriage 110 may move after expiration of a predefined period of time from when the second carriage 120 is begun to move.

According to examples, the controller 130 may cause the second carriage 120 to move to a service station 402 as shown in FIG. 4, for instance, according to a set schedule, as needed, etc. As discussed herein, the controller 130 may cause the first carriage 110 to move across the build area 106 and the first energy source 114 to output energy 118 on the build material layer 104 while the agent delivery device 122 is being serviced to, for instance, maintain the temperature of the build material 102 at or above a predetermined temperature.

According to examples, the controller 130 may cause the agent delivery device 122 to selectively deposit an agent onto the build material layer 104 during the second pass as discussed herein above with respect to FIG. 3A. In addition, the controller 130 may cause a platform on which the build area 106 is provided to be moved vertically away from the first carriage 110 as shown in FIG. 3B. Moreover, the controller 130 may cause the first carriage 110 to move in the second direction 302, in which the first energy source 114 may output energy 118 onto the build material layer 104 and the deposited agent 126 and the laying device 112 may form another build material layer 304 as the first carriage 110 is moved in the second direction 302 as shown in FIG. 3O.

Some or all of the operations set forth in the method 500 may be contained as utilities, programs, or subprograms, in any desired computer accessible medium. In addition, the method 500 may be embodied by computer programs, which may exist in a variety of forms. For example, the method 500 may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 6:
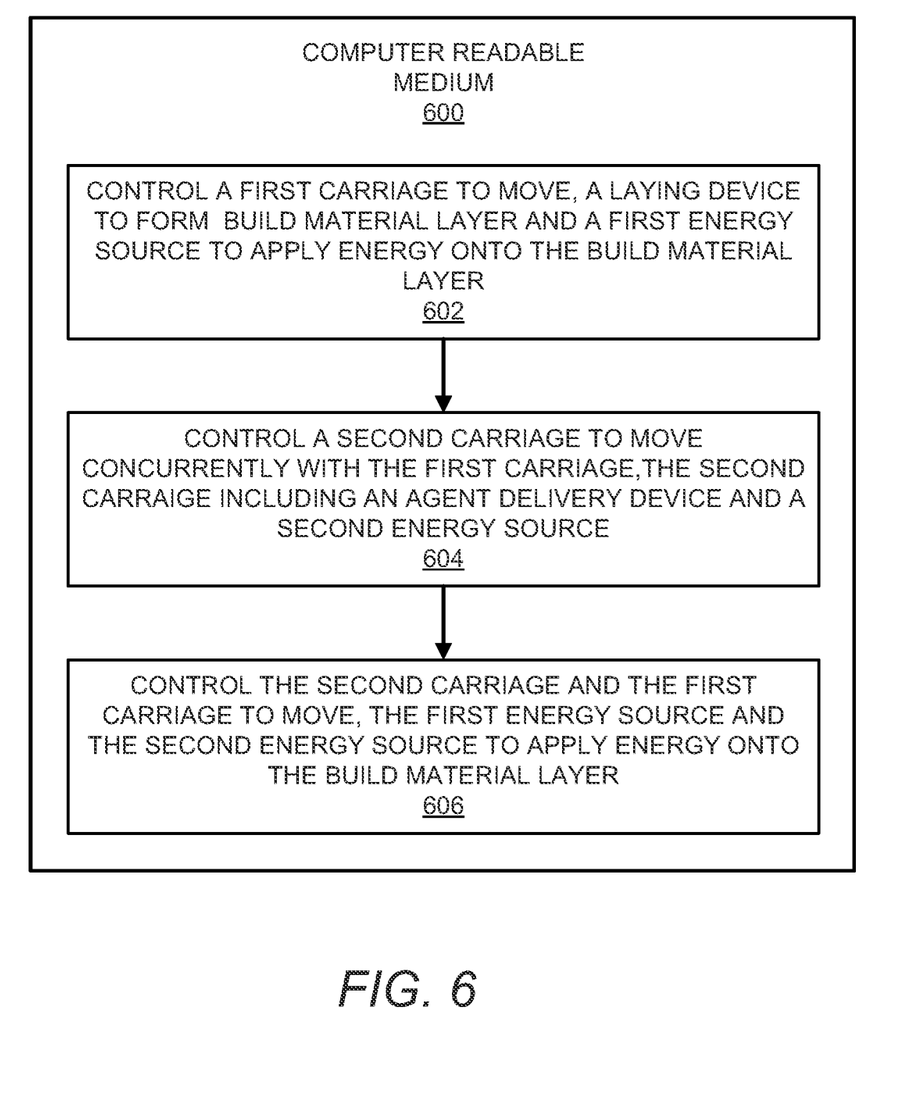
FIG. 6 shows a block diagram of an example computer readable medium that may have stored thereon machine readable instructions that when executed by a controller, may cause the controller to control movement of a first carriage and a second carriage, in which the first carriage and the second carriage each includes a respective energy source.

Turning now to FIG. 6, there is shown a block diagram of an example computer readable medium 600 that may have stored thereon machine readable instructions that when executed by a controller, may cause the controller to control movement of a first carriage 110 and a second carriage 120, in which the first carriage 110 and the second carriage 120 each includes a respective energy source 114, 124. It should be understood that the computer readable medium 600 depicted in FIG. 6 may include additional instructions and that some of the instructions described herein may be removed and/or modified without departing from the scope of the computer readable medium 600 disclosed herein. The computer readable medium 600 may be a non-transitory computer readable medium. The term "non-transitory" does not encompass transitory propagating signals.

The computer readable medium 600 may have stored thereon machine readable instructions 602-606 that a controller, such as the controller 130 depicted in FIGS. 1-4, may execute. The computer readable medium 600 may be an electronic, magnetic, optical, or other physical storage device that contains or stores executable instructions. The computer readable medium 600 may be, for example, Random Access memory (RAM), an Electrically Erasable Programmable Read-Only Memory (EEPROM), a storage device, an optical disc, and the like.

The controller may fetch, decode, and execute the instructions 602 to control a first carriage 110 to move from a first side to a second side of a build area 106. As discussed herein, the first carriage 110 may support a laying device 112 to form a build material layer 104 over the build area 106 and a first energy source 114 to apply energy 118 onto the build material layer 104. The controller may fetch, decode, and execute the instructions 604 to control a second carriage 120 to move concurrently with the first carriage 110. The second carriage 120 may support an agent delivery device 122 to selectively deposit an agent 126 onto the build material layer 104 and a second energy source 124 to apply energy 128 onto the build material layer 104 and the deposited agent 126. The controller may fetch, decode, and execute the instructions 606 to control the second carriage 120 and the first carriage 110 to move from the second side to the first side, in which the second energy source 124 and the first energy source 114 may apply energy 118, 128 onto the build material layer 104 and the deposited agent 126. According to examples, the controller 130 may cause the agent delivery device 122 to selectively deposit the agent 126 onto the build material layer 104 during movement from the second side to the first side, in which the first energy source 114 may apply energy onto the build material layer 104 and the deposited agent 126.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A system comprising:
a first carriage carrying a laying device and a first energy source, the first energy source comprising a heating lamp and a first fusing lamp, the first carriage being moveable over a build area, wherein the laying device is to form a build material layer over the build area and the first energy source is to apply energy onto the build material layer as the first carriage is moved over the build material layer;

a second carriage carrying an agent delivery device and a second energy source, wherein the second energy source comprises a second fusing lamp, wherein the agent delivery device is to selectively deliver an agent onto the layer of build material and the second energy source is to apply energy onto the agent and the layer of build material as the second carriage is moved across the build layer;

a mechanism along which the first carriage and the second carriage may move across the build area; and a controller to control movement of the first carriage and the second carriage across the build area, wherein the first carriage is independently moveable with respect to the second carriage, the controller further to:

move the first carriage and the second carriage together in a first direction along the mechanism; and move the first carriage and the second carriage, either together or separately, in a second direction along the mechanism.

2. The system of claim 1, wherein the agent delivery device is positioned at a location that is between the first energy source and the second energy source.

3. The system of claim 1, wherein the controller is to:
during a first pass,
cause the first carriage to move a first direction across the build area to cause the laying device to a form a first portion of the build material layer over the build area and the first energy source to apply warming energy as the first carriage is moved in the first direction;
cause the second carriage to move in the first direction; and
cause the agent delivery device to selectively deposit agent onto the build material layer and the second energy source to apply fusing energy onto the build material layer and the deposited agent as the second carriage is moved in the second direction.

4. The system of claim 3, wherein the controller is further to:
during a second pass,
cause the second carriage to move in a second direction, wherein the second energy source is to apply fusing energy onto the build material layer and the deposited agent as the second carriage is moved in the second direction;
cause the agent delivery device to selectively deposit agent onto the build material layer;
cause a platform on which the area is provided to be moved vertically away from the first carriage; and
cause the first carriage to move in the second direction, wherein the first energy source is to apply fusing energy onto the material layer and the deposited agent and the laying device is to form another build material layer as the first carriage is moved in the second direction.

5. The system of claim 4, wherein the controller is to repeat a sequence of the first pass and the second pass for multiple successive layers of build material.

6. The system of claim 4, wherein the controller is to cause the first carriage and the second carriage to move together during the first pass and the second pass.

7. The system of claim 1, further comprising:
a servicing station; and
wherein the controller is further to:
cause the second carriage to be positioned over the servicing station for the agent delivery device to be serviced; and
cause the first carriage to be moved across the build area to apply energy onto the build material layer and maintain a temperature of the build material layer above a predefined temperature while the agent delivery device is serviced.

8. The system of claim 1, wherein the controller:
controls the first energy source to apply a warming energy onto the build material layer as the first carriage is moved over the build material layer during a first pass in the first direction;
controls the second energy source to apply a fusing energy greater than the warming energy onto the agent and the layer of build material as the second carriage is moved across the build layer during the first pass in the first direction; and
controls the first energy source and the second energy source to apply a fusing energy during a second pass in the second direction.

9. A method comprising:
moving a first carriage and a second carriage together in a first direction across a build area during a first pass, wherein, during the first pass,
a laying device on the first carriage is to form a build material layer and a first energy source on the first carriage to output energy from a heating lamp; and
an agent delivery device on the second carriage is to selectively deposit an agent onto the build material layer, wherein a second energy source on the second carriage is to output energy to heat the build material layer and the deposited agent from a first fusing lamp; and
moving the first carriage and the second carriage, either together or separately, in a second direction across the build area during a second pass, wherein during the second pass, the second energy source and the first energy source are to output energy from a second fusing lamp to heat the build material layer and the deposited agent.

10. The method of claim 9, further comprising:
causing the second carriage to move to a service station, wherein the service station is to service the agent delivery device; and
causing the first carriage to move across the build area and the first energy source to output energy on the build material layer while the agent delivery device is being serviced.

11. The method of claim 9, further comprising:
during the second pass,
causing the agent delivery device to selectively deposit an agent onto the build material layer;
causing a platform on which the build area is provided to be moved vertically away from the first carriage; and
causing the first carriage to move in the second direction, wherein the first energy source is to output energy onto the build material layer and the deposited agent and the laying device is to form another build material layer as the first carriage is moved in the second direction.

12. The method of claim 9, further comprising:
causing the first carriage and the second carriage to move together during the first pass; and
causing the second carriage and the first carriage to move together during the second pass.

13. The method of claim 9, further comprising:
causing the first carriage to begin to move after expiration of a predefined period of time from when the second carriage has begun to move during the second pass of the first carriage and the second carriage.

14. The method of claim 9, the method further comprising:

during the first pass;

outputting a warming energy from the first energy source on the first carriage onto the build material layer as the first carriage is moved over the build material layer to form the build material layer; and outputting a fusing energy greater than the warming energy from the second energy source on the second carriage to heat the build material layer and the deposited agent; and during the second pass, outputting the fusing energy from the second energy source and the first energy source to heat the build material layer and the deposited agent.

15. A non-transitory computer readable medium on which is stored machine readable instructions that, when executed by a controller, cause the controller to:

control a first carriage to move along a mechanism in a first direction from a first side to a second side of a build area, the first carriage supporting a laying device to form a build material layer over the build area and a first energy source to apply energy onto the build material layer, wherein the first energy source comprises a heating lamp and a first fusing lamp;

control a second carriage to move concurrently along the mechanism in the first direction with the first carriage, the second carriage supporting an agent delivery device to selectively deposit an agent onto the build material layer and a second energy source to apply energy onto the build material layer and the deposited agent, wherein the second energy source comprises a second fusing lamp; and control the second carriage and the first carriage to move along the mechanism in a second direction from the second side to the first side, wherein the second energy source and the first energy source area to apply energy onto the build material layer and the deposited agent.

16. The computer readable medium of claim 15, wherein the instructions are further to cause the controller to:

cause the agent delivery device to selectively deposit the agent onto the build material layer during movement from the second side to the first side, wherein the first energy source is to apply energy onto the build material layer and the deposited agent.

17. The computer readable medium of claim 15, wherein the instructions are further to cause the controller to:

control the first energy source to apply a warming energy onto the build material layer as the first carriage is moved over the build material layer during a first pass in the first direction;

control the second energy source to apply a fusing energy greater than the warming energy onto the agent and the layer of build material as the second carriage is moved across the build layer during the first pass in the first direction; and control the first energy source and the second energy source to apply a fusing energy during a second pass in the second direction.

\* \* \* \* \*